United States Patent [19]

Cole et al.

[11] Patent Number: 5,048,566

[45] Date of Patent: Sep. 17, 1991

[54] ONE-PIECE BLOW-MOLDED VALVE AND ACTUATOR

[75] Inventors: Lloyd G. Cole, Tecumseh; David R. Martin, Chatham, both of Canada

[73] Assignee: Siemens Automotive Limited, Chatham, Canada

[21] Appl. No.: 586,480

[22] Filed: Sep. 21, 1990

[51] Int. Cl.⁵ .................... F16K 11/02; F16K 11/065
[52] U.S. Cl. .................................. 137/625.4; 251/61; 251/61.2
[58] Field of Search ............... 137/625.4; 251/61, 61.2

[56] References Cited

U.S. PATENT DOCUMENTS

| | | |
|---|---|---|
| 826,637 | 7/1906 | Wilkins . |
| 1,048,228 | 12/1912 | Sutherland . |
| 1,624,348 | 4/1927 | Mallory . |
| 2,213,785 | 9/1940 | Larson et al. . |
| 3,550,847 | 12/1970 | Scott ................................. 251/61 X |
| 3,588,036 | 6/1971 | Harter ................................. 251/61 |
| 3,881,686 | 5/1975 | Hirmann ........................ 251/61.2 X |
| 3,918,421 | 11/1975 | Berry et al. . |
| 4,070,001 | 1/1978 | Musgrove . |
| 4,367,764 | 1/1983 | Fitzgerald et al. . |

Primary Examiner—Arnold Rosenthal
Attorney, Agent, or Firm—George L. Boller; Russel C. Wells

[57] ABSTRACT

A valve assembly embodies a valve element, an expansible and contractible chamber space having porting via which it is expanded and contracted, and a connecting rod that transmits the expansion and contraction of the chamber space to the valve element, in a signal plastic part.

9 Claims, 1 Drawing Sheet

ONE-PIECE BLOW-MOLDED VALVE AND ACTUATOR

BACKGROUND AND SUMMARY OF THE INVENTION

This invention relates to a valve assembly wherein a valve element is selectively positioned within a flow passage to control fluid flow through the flow passage and the selective positioning of the valve element is performed by means of an actuator comprising a chamber space that is expanded and contracted in volume by introduction and removal of control fluid into and from the chamber space.

A preliminary novelty search developed the following U.S. Pat. Nos. 826,637; 1,048,228; 1,624,348; 2,213,785; 3,918,421; 4,070,001; and 4,367,764.

In prior valves, the valve element, the expansible and contractible chamber space, and the coupling of the chamber space to the valve element comprise an assembly of several parts.

In contrast to prior valves and actuators, the present invention provides the valve element, the expansible and contractible chamber space, and the coupling of the chamber space to the valve element in a single plastic part. The single part can be fabricated by a conventional blow-molding process. The single part is made to be resiliently flexible in the region of its expansible and contractible chamber space and to be stiff elsewhere. One way of imparting these characteristics to respective regions of the single part is by the particular design and dimensioning (e.g. thickness) of the different regions. The particular material that is used to fabricate the part may also have an influence on the performance characteristics of the part.

One of the significant advantages of the invention is that the valve assembly can be constructed from a fewer number of individual parts. This simplification has favorable cost implications, especially when the invention is embodied in the thermal valve of the air induction system of an automotive internal combustion engine. Prior thermal valves usually require a vacuum actuator (itself having several parts), a flap door (valve element), and a connecting rod.

Further features, benefits, and advantages of the invention will be seen in the ensuing detailed description of a preferred embodiment. Drawings accompany the disclosure and illustrate the best mode contemplated at this time for putting the preferred embodiment into practice.

DESCRIPTION OF THE PREFERRED EMBODIMENT

Figure 1:
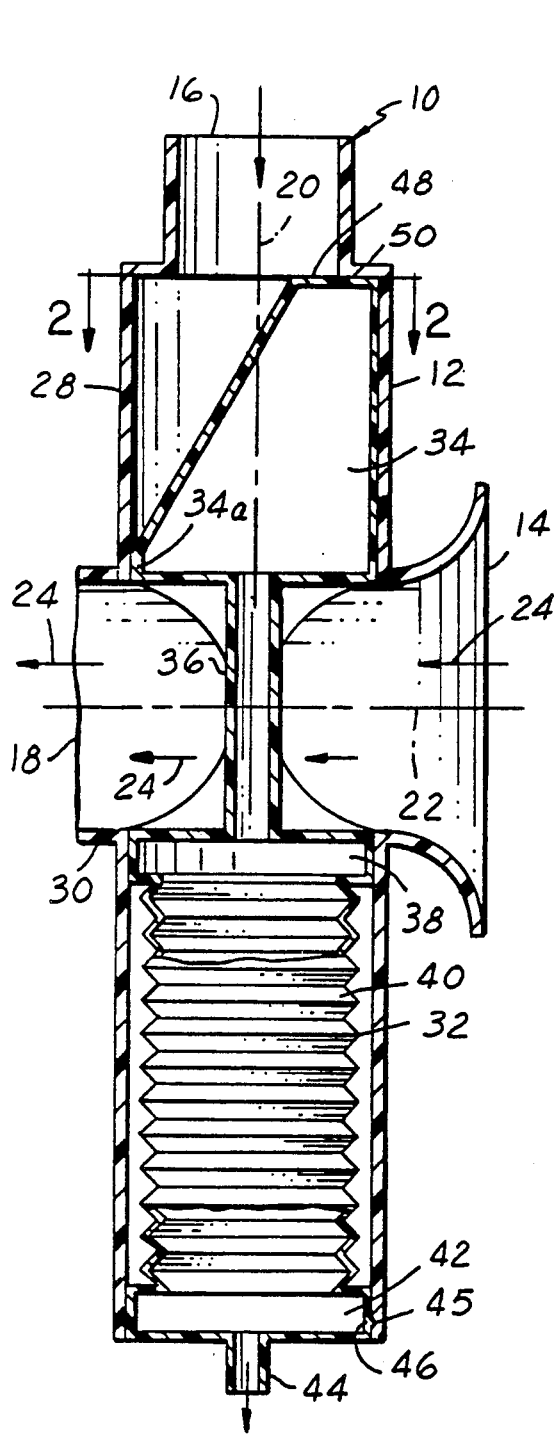
FIG. 1 is a longitudinal cross sectional view through a valve assembly which embodies principles of the invention.
Figure 2:
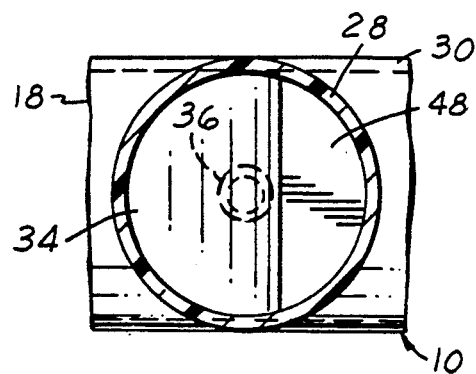
FIG. 2 is a transverse cross sectional view taken in the direction of arrows 2—2 in FIG. 1.

The drawings show an example of a thermal valve assembly 10 for the air induction system of an automobile engine (not shown). The valve assembly comprises a body 12 having an ambient air (fresh air) inlet 14, a warm air inlet (from a manifold stove, for example) 16, and an outlet 18 leading to the usual air filter element that filters certain particulates from the induction air before they can enter the air or throttle body. Body 12 comprises a first axis 20 and a second axis 22 which are transversely intersecting at a right angle. A flow passage 24, coaxial with axis 22, extends from inlet 14 to outlet 18. A flow passage 26 extends from inlet 16 to outlet 18. Although the valve body is a single part preferably fabricated from a suitable plastic material by a conventional fabrication process, its shape is that of two intersecting tubes 28 and 30 which are of essentially equal diameters at their right angle intersection, tube 28 being coaxial with axis 20 and tube 30 coaxial with axis 22.

Figure 3:
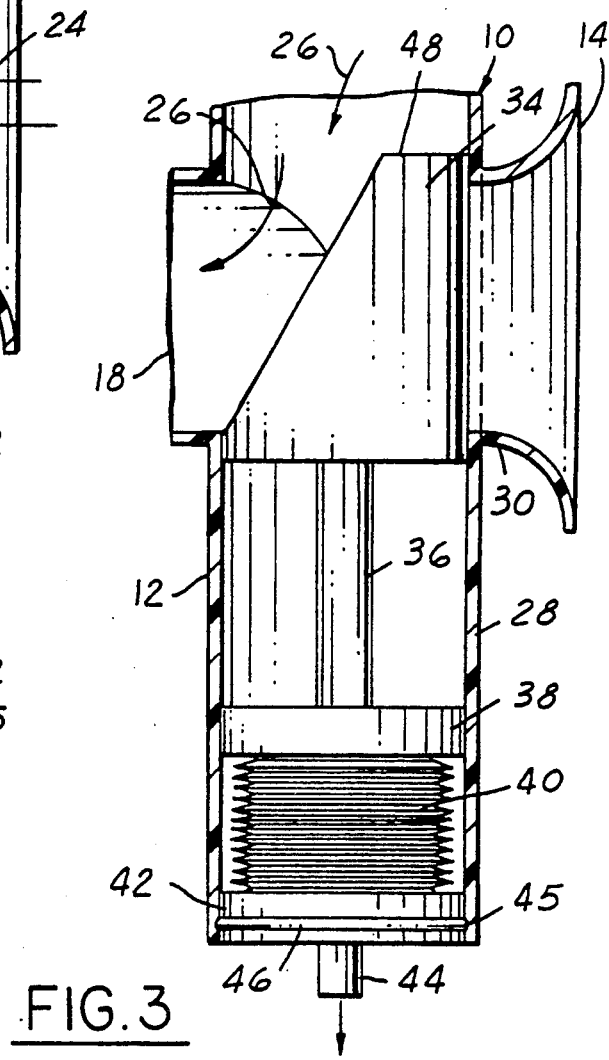
FIG. 3 is a view similar to FIG. 1 showing an alternate position.

Disposed within tube 28 is a single plastic part 32 which comprises a valve element 34, a connecting rod 36, a first fixed volume chamber space portion 38, a variable volume chamber space portion 40, a second fixed volume chamber space portion 42, and porting 44. FIG. 1 shows a position of part 32 that concurrently permits flow through flow passage 24 and blocks flow through flow passage 26; FIG. 3 shows a position that concurrently blocks flow through flow passage 24 and permits flow through flow passage 26.

Valve element 34 is in the shape of a truncated cylinder that has a close sliding fit within tube 28 for selective positioning between the positions of FIGS. 1 and 3. Connecting rod 36 is of a significantly smaller diameter. In the FIG. 1 position, the portion 34a of valve element 34 that is immediately contiguous connecting rod 36 has closure with the wall of tube 28 to fully obturate inlet 16 and thereby close flow passage 26 to flow, and since connecting rod 36 has a smaller diameter, fluid can pass through flow passage 24, flowing from inlet 14, around connecting rod 36, to outlet 18.

Fixed volume chamber space portion 42 provides for affixing of the immediately contiguous axial end of variable volume chamber space portion 40 to tube 28. Specifically, the internal wall of tube 28 comprises a groove 45 into which snap-fits a complementary bead 46 that extends around the exterior of the sidewall of fixed volume chamber space portion 42. Assembly of part 32 to body 12 is accomplished by disposing the part such that valve element 34 is toward the end of tube 28 which contains groove 45, aligning the longitudinal axis of the part with axis 20, and then bodily advancing the part into the tube until bead 46 snaps into groove 45. In the free state of part 32, the overall axial dimension from bead 46 to the far axial end face 48 of valve element 34 is preferably slightly greater than the axial dimension of tube 28 from groove 45 to a shoulder 50 which is adjacent inlet 16 so that during the step of assembling the part 32 to body 12, end face 48 will abut shoulder 50 slightly before bead 46 snaps into groove 45. Upon the occurrence of such abutment, the additional motion that is required to snap bead 46 into groove 45 will be taken up by a corresponding amount of axial compression of variable volume chamber space portion 40. Such a construction of part 32 relative to body 12 will assure that both valve element 34 and fixed volume chamber space portion 38 are properly located with respect to tube 30, as shown in FIG. 1. If it is desired to circumferentially key part 52 to body 12, suitable molded-in keying structure may be incorporated in the two parts.

Porting 44 is formed as a portion of part 32 and embodied as a tubular nipple in the axial end wall of fixed volume chamber space portion 42 that closes the corresponding end of tube 28. The porting is coaxial with axis 20 in the valve assembly. In use, it is intended that the interior of variable volume chamber space portion 40 be communicated to a control fluid by means of a valve-containing conduit (not shown), which serves to control the ingress and egress of control fluid to and from the interior of variable volume chamber space portion 40. For amounts of control fluid in variable volume chamber space portion 40 which create a pressure therein equal to or greater than a certain first pressure level, part 32 assumes the position of FIG. 1. For lesser amounts of control fluid in variable volume chamber space portion 40 which create a pressure therein extending down to a certain second pressure level, variable volume chamber space portion 40 progressively increasingly collapses in axial length, increasingly pulling valve element 34 into the space that is defined by the intersection of the two tubes 28 and 30. For amounts of control fluid in variable volume chamber space portion 40 which create therein pressures that are equal to or less than said certain second pressure level, variable volume chamber space portion 40 is fully axially collapsed as portrayed by FIG. 3's showing of the complete obturation of inlet 14 by valve element 34. For any valve element position between those of FIG. 1 and FIG. 3, the two flow passages have confluence to outlet 18, the relative proportions of the confluent flow attributable to each inlet being determined by the respective degrees of obturation of the respective inlets by the valve element.

One suitable source of control fluid for operating the valve assembly is a vacuum source, in which case an increasing vacuum applied to porting 44 will be effective to suck variable volume chamber space portion 40 toward collapse while a decreasing vacuum will allow the resiliency of chamber space portion 40 to axially expand the chamber space's volume.

An especially advantageous way to fabricate the part 32 is by a blow molding process. Porting 44 can be used as the blow pin location, in which case both valve element 34 and connecting rod 36 are made hollow by the blow.

The coactive effect of the fits of fixed volume chamber space portions 38 and 42 with respect to tube 28 should minimize leakage through the tube around the exterior of variable volume chamber space portion 40 without impeding the accurate and faithful response of portion 40 to changes in the pressure of control fluid therein. The illustrated embodiment of portion 40 is a corrugated bellows which possesses the requisite flexibility for axial expansion and retraction in response to the range of pressures which it is intended to contain. The other portions of part 32 are essentially rigid. By use of suitable material and design of the bellows, the bellows may be endowed with a certain inherent resiliency that can in certain uses of the invention aid in returning a fully or partially collapsed bellows toward its free state. Alternatively, the bellows could be molded about a helical coil spring which would provide resiliency. Sometimes resiliency may be unimportant, or even unnecessary.

An example of a material which is suitable for part 32 is a polyester elastomer sold under the trade name HYTREL by DuPont.

While a preferred embodiment of the invention has been illustrated and described, it should be understood that the inventive principles may be practiced in other equivalent embodiments.

What is claimed is:

1. A valve assembly comprising a flow passage within which a valve element is selectively positioned by an actuator which comprises a chamber space that is expanded and contracted in volume to position said valve element and porting that provides ingress to and egress from said chamber space for a control fluid that establishes the volume of said chamber space, and hence the position of said valve element, said valve assembly further comprising a connecting rod that is between said chamber space and said valve element to transmit the expansion and contraction of said chamber space to said valve element, characterized in that said valve element and said chamber space are a single plastic part, and in that said single plastic part also comprises said connecting rod.

2. A valve assembly as set forth in claim 1 characterized further in that said single plastic part also comprises said porting.

3. A valve assembly comprising a flow passage within which a valve element is selectively positioned by an actuator which comprises a chamber space that is expanded and contracted in volume to position said valve element and porting that provides ingress to and egress from said chamber space for a control fluid that establishes the volume of said chamber space, and hence the position of said valve element, and characterized in that said valve element and said chamber space are a single plastic part, and in that said valve element comprises a hollow interior.

4. A valve assembly as set forth in claim 3 further characterized in that a hollow connecting rod is provided between said valve element and said chamber space to transmit the expansion and contraction of said chamber space to said valve element and in that the hollow interior of said valve element is placed in communication with said chamber space by said hollow connecting rod.

5. A valve assembly as set forth in claim 4 further characterized in that said chamber space comprises a resilient wall portion that serves to urge said chamber space to return toward a given volume when the volume of said chamber space has been changed from said given volume by the control fluid in said chamber space.

6. A valve assembly as set forth in claim 5 further characterized in that said resilient wall portion comprises a bellows that is contracted in axial length when the volume of said chamber space is reduced from said given volume.

7. A valve assembly as set forth in claim 6 further characterized in that said single plastic part comprises one fixed volume chamber portion at one axial end of said bellows and another fixed volume chamber portion at another axial end of said bellows, said one and another fixed volume chamber portions enclosing opposite axial ends of said bellows.

8. A valve assembly as set forth in claim 7 further characterized in that said single plastic part comprises said porting, said porting is at an axial end of said one fixed volume chamber portion, and one axial end of said hollow connecting rod joins an axial end of said another fixed volume chamber.

9. A valve assembly as set forth in claim 8 characterized further in that said single plastic part is disposed in a cylindrical portion of a valve body that contains said flow passage, including means affixing said one fixed volume chamber portion to said cylindrical portion of said valve body so as to render said another fixed volume chamber portion, said connecting rod, and said valve element movable axially within said cylindrical portion of said valve body as said bellows is contracted in axial length.

* * * * *